United States Patent

Robert et al.

[11] Patent Number: 5,571,486
[45] Date of Patent: Nov. 5, 1996

[54] METHOD AND APPARATUS FOR TOP-CHARGING SOLID WASTE INTO A MOLTEN METAL BATH

[75] Inventors: Edgar J. Robert, Glenshaw, Pa.; F. James Howie, III, Boxborough, Mass.; Christopher J. Nagel, Wayland, Mass.; Thomas P. Griffin, Norton, Mass.

[73] Assignee: Molten Metal Technology, Inc., Waltham, Mass.

[21] Appl. No.: 442,024

[22] Filed: May 16, 1995

Related U.S. Application Data

[62] Division of Ser. No. 42,609, Apr. 2, 1993, Pat. No. 5,491,279.

[51] Int. Cl.[6] .................................................. C22B 7/00
[52] U.S. Cl. ........................................ 422/184.1; 588/201
[58] Field of Search ........................... 422/184, 168; 266/46, 189; 588/201; 110/235

[56] References Cited

U.S. PATENT DOCUMENTS

| | | | |
|---|---|---|---|
| 3,647,358 | 3/1972 | Greenberg | 23/2 R |
| 3,845,190 | 10/1974 | Yosim et al. | 423/184 |
| 3,880,411 | 4/1975 | Voronova et al. | 266/34 |
| 4,047,707 | 9/1977 | Knüppel et al. | 266/222 |
| 4,145,396 | 3/1979 | Grantham | 423/22 |
| 4,405,365 | 9/1983 | Robert | 75/60 |
| 4,574,714 | 3/1986 | Bach et al. | 110/346 |
| 4,602,574 | 7/1986 | Bach et al. | 110/346 |
| 5,000,101 | 3/1991 | Wagner | 422/184 |
| 5,170,728 | 12/1992 | Tanari | 110/346 |
| 5,301,620 | 4/1994 | Nagel et al. | 110/346 |
| 5,358,697 | 10/1994 | Nagel | 422/184 |
| 5,443,572 | 8/1995 | Wilkinson et al. | 422/184 |
| 5,505,143 | 4/1996 | Nagel | 422/184 |

*Primary Examiner*—Timothy McMahon
*Attorney, Agent, or Firm*—Hamilton, Brook, Smith & Reynolds, P.C.

[57] ABSTRACT

A method and apparatus for top-charging a solid waste into a molten metal bath to form a dissociation product are disclosed. The method includes introducing the waste into the molten metal bath through a refractory tube disposed in a reactor, containing the molten metal bath, through which the refractory tube extends. A gas outlet is disposed above the molten metal bath. The refractory tube has a submergible end which is immersed in the molten metal bath and which defines a lower opening at the terminal end of the refractory tube and an elevated opening, whereby a portion of the molten metal bath enters the refractory tube through the lower opening to allow the molten metal bath to remain within the refractory tube while at least partially dissociating the waste to form the dissociation product in the molten metal bath. An oxidizing agent can be directed into the molten metal bath at a rate sufficient to form an gaseous oxygenated product which is discharged from the reactor.

24 Claims, 2 Drawing Sheets

5,571,486

METHOD AND APPARATUS FOR TOP-CHARGING SOLID WASTE INTO A MOLTEN METAL BATH

This is a division of application Ser. No. 08/042,609 filed Apr. 2, 1993, now U.S. Pat. 5,491,279 which is incorporated herein by reference in its entirety.

BACKGROUND OF THE INVENTION

Disposal of hazardous wastes, such as organic waste, in landfills and by incineration has become an increasingly difficult problem because of diminishing availability of disposal space, strengthened governmental regulations and the growing public awareness of the impact of hazardous substance contamination upon the environment. Release of hazardous wastes to the environment can contaminate air and water supplies thereby diminishing the quality of life in the affected populations.

To minimize harmful environmental effects of hazardous waste disposal, methods must be developed to convert these wastes into benign, and preferably, useful substances. In response to this need, there has been a substantial investment in the development of alternate methods for suitably treating such wastes. One of the most promising new methods is described in U.S. Pat. Nos. 4,574,714 and 4,602,574, issued to Bach et al., and includes destroying organic hazardous wastes by dissociating the waste in molten metal. Atomic components of the wastes are reformed in the molten metal to generate environmentally acceptable products, such as hydrogen and carbon oxide gases.

SUMMARY OF THE INVENTION

The present invention relates to a method and apparatus for top-charging a solid waste into a molten metal bath contained in a reactor wherein the solid waste is dissociated into dissociation products which are subsequently oxidized to form one or more gaseous oxygenated products.

The method includes introducing the waste into the reactor through a refractory tube which extends within the reactor into the molten metal bath. The refractory tube has a submergible end which is immersed in the molten metal bath. The submergible end has a lower opening at a terminal portion of the submergible end and at least one elevated opening, whereby a portion of the molten metal bath enters the refractory tube through the lower opening for dissociating the waste and for forming the gaseous oxygenated product. Gaseous oxygenated product which forms in the refractory tube passes out of the refractory tube through the elevated opening and is discharged from the reactor through a reactor outlet disposed above the molten metal bath.

The apparatus includes a reactor having a reactor outlet disposed above the molten metal bath and a refractory tube. The refractory tube extends within the reactor, through which the solid waste can be introduced into the molten metal bath. The refractory tube has a submergible end for immersion into the molten metal bath. The submergible end has a lower opening at a terminal portion of the submergible end and at least one elevated opening, whereby a portion of the molten metal bath enters the refractory tube through the lower opening for dissociating the waste and for forming the oxygenated product. Gaseous oxygenated product which forms in the refractory tube passes out of the refractory tube through the elevated opening end and is discharged from the reactor through the reactor outlet.

This invention provides several advantages for top-charging waste into a molten metal bath. For example, contamination of gaseous products from the reactor with incompletely dissociated components of waste directed into the bath is eliminated or minimized. Another advantage is that waste material can be directed whole, such as in chunks or whole containers with waste therein, into the molten metal bath through the refractory tube and need not be comminuted or fluidized prior to introduction.

DETAILED DESCRIPTION OF THE INVENTION

The features and other details of the method and apparatus of the invention will now be more particularly described with reference to the accompanying drawings and pointed out in the claims. It will be understood that the particular embodiments of the invention are shown by way of illustration and not as limitations of the invention. The principal features of this invention can be employed in various embodiments without departing from the scope of the invention.

The present invention relates generally to a method and apparatus for top-charging solid waste into a molten metal bath contained in a reactor, wherein solid waste is dissociated into dissociation products which are subsequently oxidized to form one or more gaseous oxygenated product. A process and apparatus for dissociating waste in molten metal baths are disclosed in U.S. Pat. Nos. 4,574,714 and 4,602,574, issued to Bach et al. The method and apparatus can destroy polychlorinated biphenyls and other organic wastes, optionally together with inorganic wastes. Both U.S. Pat. Nos. 4,574,714 and 4,602,574 are hereby incorporated by reference.

Figure 1:
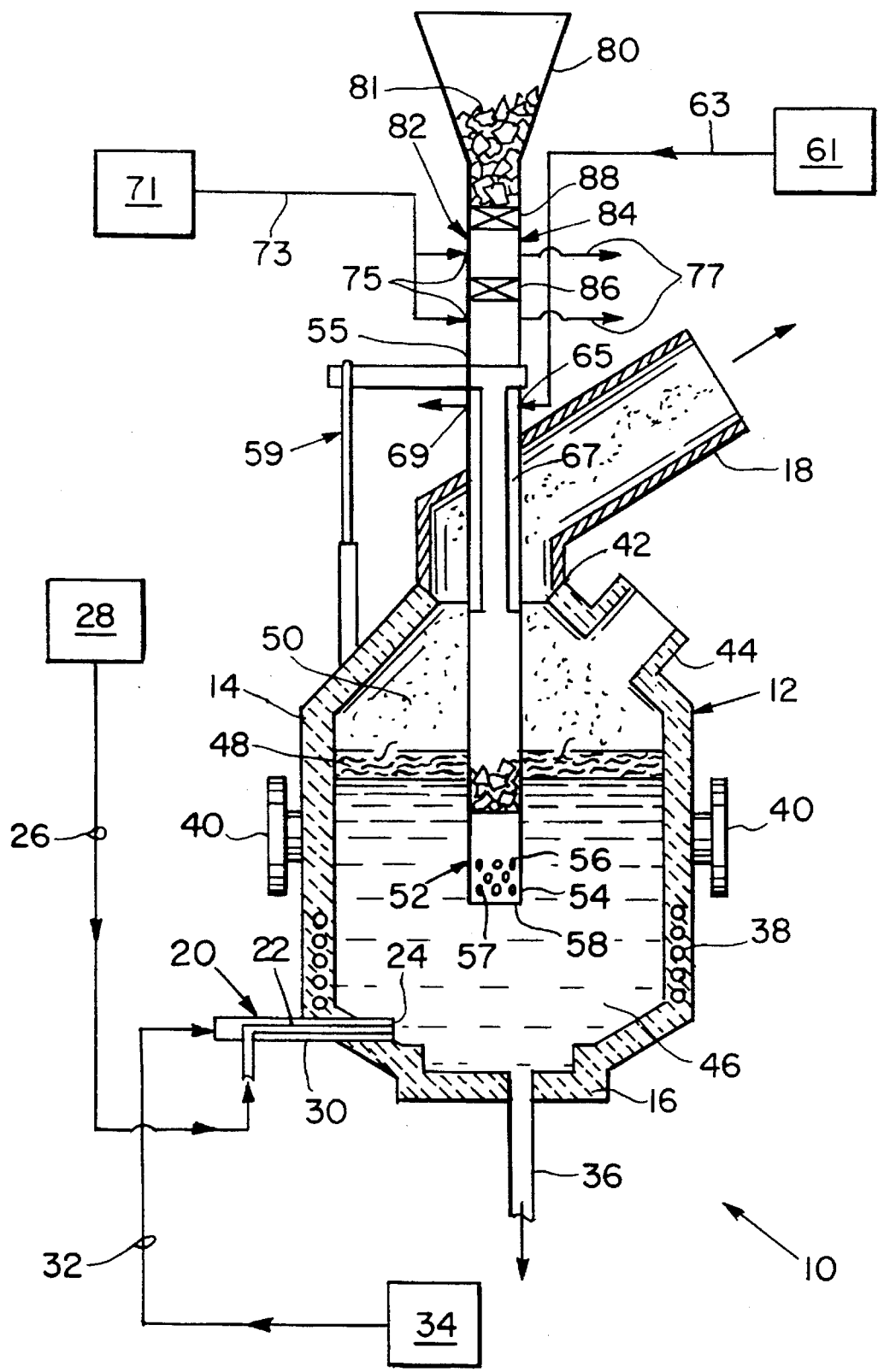
FIG. 1 is a cut-away side elevational view of one embodiment of the apparatus of the present invention.

One embodiment of the invention is illustrated in FIG. 1. Therein, system 10 includes reactor 12 for containing a molten metal bath suitable for dissociating a solid waste. Examples of suitable reactors include appropriately modified steelmaking vessels known in the art, such as K-BOP, Q-BOP, argon-oxygen decarbonization furnaces (AOD), BOF, etc. Reactor 12 includes upper portion 14 and lower portion 16. Off-gas outlet 18 extends from upper portion 14 and is suitable for conducting an off-gas composition out of reactor 12.

Tuyere 20 is located at lower portion 16 of reactor 12. Tuyere 20, which is a concentric tuyere, includes oxidizing agent tube 22 for injection of a separate oxidizing agent at oxidizing agent inlet 24. Line 26 extends between oxidizing agent tube 22 and oxidizing agent source 28. Outer tube 30 of tuyere 20 is disposed concentrically about oxidizing agent tube 22 at oxidizing agent inlet 24. Line 32 extends between outer tube 30 and shroud gas source 34 for conducting a suitable shroud gas from shroud gas source 34 through the concentric opening between outer tube 30 and oxidizing agent tube 22 to oxidizing agent inlet 24. Oxidizing gas can be oxygen or air, which can oxidize a portion of the waste to form a dissociation product, such as carbon monoxide or carbon dioxide.

Bottom tapping spout 36 extends from lower portion 16 of reactor 12 and is suitable for removal of molten metal from reactor 12.

Induction coil 38 is located at lower portion 16 for heating molten metal bath 46 in reactor 12. It is to be understood that, alternatively, reactor 12 can be heated by other suitable means, such as by oxyfuel burners, electric arcs, etc.

Trunions 40 are located at reactor 12 for manipulation of reactor 12. Seal 42 is between off-gas outlet 18 and port 44 and is suitable for allowing partial rotation of reactor 12 about trunions 40 for removal of molten metal 46 from reactor 12 without breaking seal 42.

Molten metal bath 46 is formed within reactor 12. Molten metal bath 46 can include metals or molten salt or combinations thereof. Examples of suitable metals include iron, copper, nickel, zinc, etc. Examples of suitable salts include sodium chloride, potassium chloride, etc. Molten metal bath 46 can also include more than one metal. For example, molten metal bath 46 can include a solution of miscible metals, such as iron and nickel. In one embodiment, molten metal bath 46 can be formed substantially of elemental metal. Alternatively, molten metal bath 46 can be formed substantially of metal salts. Molten metal bath 46 is formed by at least partially filling reactor 12 with a suitable metal or salt. Molten metal bath 46 is then heated to a suitable temperature by activation of induction coil 38 or by other suitable means, not shown.

Suitable operating conditions of system 10 include a temperature which is sufficient to at least partially convert carbonaceous waste by dissociation to elemental carbon and other elemental constituents. Generally, a temperature in the range of between about 1,300° and about 1,700° C. is suitable.

Vitreous layer 48 is formed on molten metal bath 46. Vitreous layer 48 is substantially immiscible with molten metal bath 46. Vitreous layer 48 can have a lower thermal conductivity than that of molten metal bath 46. Radiant heat loss from molten metal bath 46 can thereby be reduced to significantly below the radiant heat loss from molten metal bath where no vitreous layer is present.

Typically, vitreous layer 48 includes at least one metal oxide. Vitreous layer 48 can contain a suitable compound for scrubbing halogens, such as chlorine or fluorine, to prevent formation of hydrogen halide gases, such as hydrogen chloride. In one embodiment, vitreous layer 48 comprises a metal oxide having a free energy of oxidation, at the operating conditions of system 10, which is less than that for the oxidation of atomic carbon to carbon monoxide, such as calcium oxide (CaO).

Refractory tube 52 extends from upper portion 14 to lower portion 16 of reactor 12. Refractory tube 52 has submergible end 54, which is immersed in molten metal bath 46, and upper end 55 above molten metal bath 46. Refractory tube 52 is made of a refractory material, such as a ceramic, which can withstand the operating conditions of reactor 12 without significant damage. It must also be capable of conveying large amounts of solid waste material at high rates without damage to the refractory tube or reactor.

Refractory tube 52 has a diameter that is sufficient to allow solid waste to be top-charged into molten metal bath 46. Submergible end 54 defines at least one elevated opening 56 above the lowest point of submergible end 54. Elevated opening 56 can be a perforation, a slot or some other type of aperture that is large enough to allow gas to flow from the interior of refractory tube 52 through elevated opening 56 to molten metal bath 46. Refractory tube 52 is open at the bottom, thereby allowing molten metal to enter submergible end 54 of refractory tube 52 while containing the waste in refractory tube 52.

Cooling gas, which can be an inert gas, is directed from cooling gas source 61 through cooling gas line 63 to cooling chamber inlet 65 at cooling chamber 67. The cooling gas exits cooling chamber 67 at cooling gas outlet 69. The cooling gas can be cooled and recycled to cooling gas source 61, or alternatively, the gas can be vented to the atmosphere.

Also disposed at upper end 55 of refractory tube 52 is charging hopper 80 which is connected to refractory tube 52 by conduit 82, through which suitable solid waste material 81 can be directed to refractory tube 52. The waste, which can flow under the force of gravity or can be assisted by mechanical means, not shown, can be in the form of comminuted solids, such as powders or non-comminuted solids, such as granules or chunks of waste. Also, the waste can be directed through refractory tube 52 contained in drums or other receptacles. Alternately, an auger, extruder or shredder could be employed in place of or in connection with hopper 80.

Disposed within conduit 82 is valve means 84 which can control the flow of waste 81 in charging hopper 80 to refractory tube 52. In one embodiment, valve means 84 includes first valve 86 and second valve 88. Valve means 84 prevents a significant amount of gas present in refractory tube 52 from escaping into charging hopper 80, thereby maintaining gas pressure in refractory tube 52. Nitrogen gas can be directed from nitrogen gas source 71 into conduit 82 above and below first valve 86 through nitrogen line 73 to nitrogen inlets 75 to remove reactive gases through nitrogen outlets 77.

Optionally, refractory tube 52 can be retractable from molten metal bath 46 by lifting means 59 to minimize the exposure of refractory tube 52 to molten metal bath 46 when refractory tube 52 is not in use.

Figure 2:
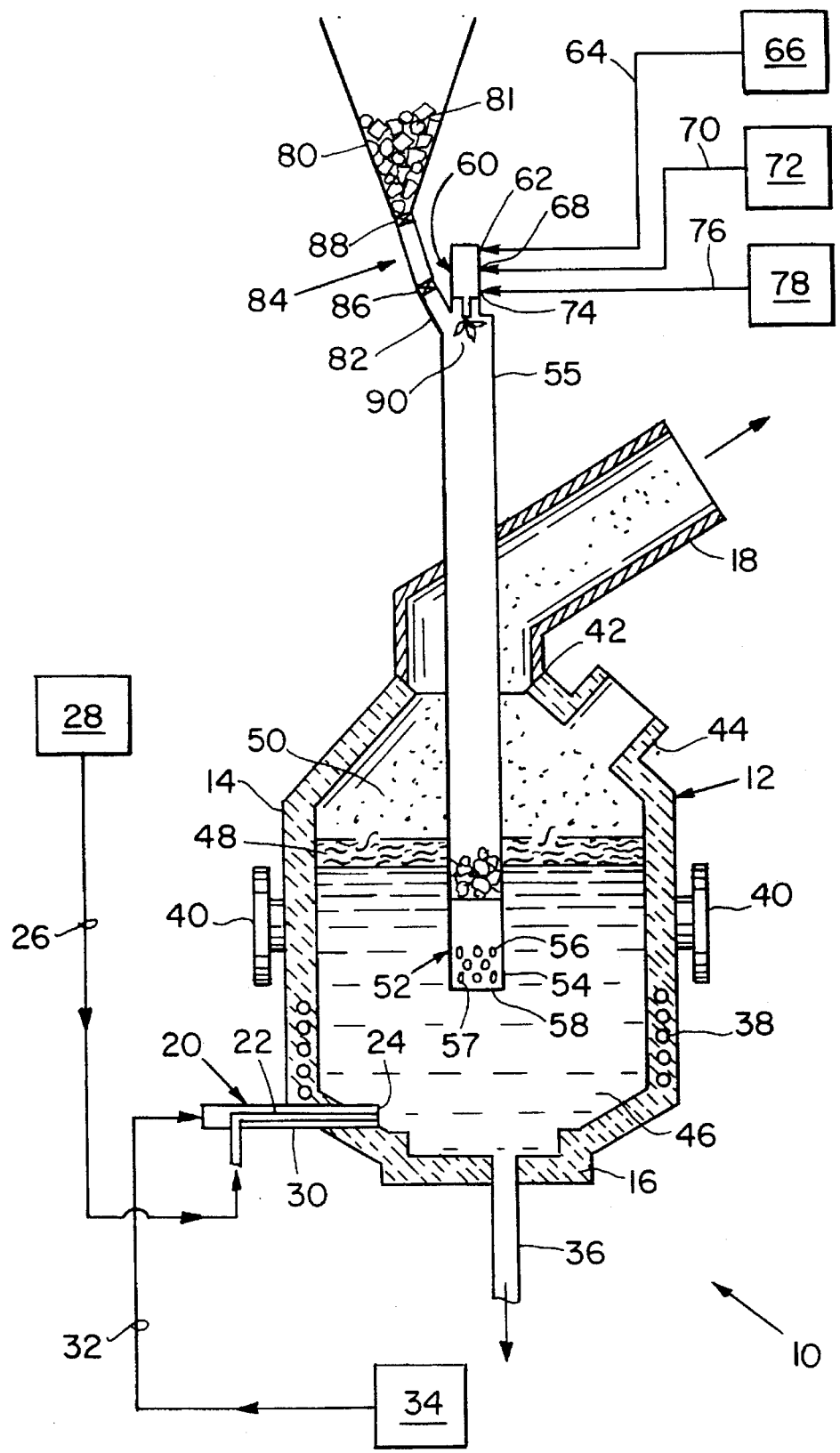
FIG. 2 is a cut-away side elevational view of another embodiment of the apparatus, including a burner disposed in a refractory tube of the invention.

FIG. 2 illustrates another embodiment of this invention. The apparatus of FIG. 2 has many of the same elements of FIG. 1 and like elements are designated with like numerals. In addition, this apparatus has means for heating waste near the inlet of the refractory tube.

As shown in FIG. 2, means for directing gas through refractory tube 52 includes oxygen inlet 62, hydrocarbon inlet 68 and inert gas inlet 74. Oxygen or another oxidizing agent is directed from oxygen source 66 through pipe 64 to oxygen inlet 62. A suitable gaseous or liquid hydrocarbon, such as propane, is directed from hydrocarbon source 72 through pipe 70 to hydrocarbon inlet 68. A suitable inert gas, such as nitrogen or argon, is directed from inert gas source 78 through pipe 76 to inert gas inlet 74. Burner 90 is disposed at oxygen inlet 62 and hydrocarbon inlet 68, and can be ignited by suitable ignition means, not shown. The oxygen, hydrocarbon and inert gases are controlled by suitable means, also not shown, to cause the gases to burn at a desired rate, thereby forming carbon dioxide and other reaction byproduct gases which are directed with the waste into molten metal bath 46.

A hydrocarbon liquid is directed from hydrocarbon source 72 through pipe 70 to hydrocarbon inlet 68 with oxygen directed through oxygen inlet 62. Burner 90 is ignited by ignition means. The flame at burner 90 preheats and at least partially burns the waste in refractory tube 52 which is received from charging hopper 84. A gas is formed which is substantially carbon dioxide and exerts sufficient pressure on molten metal bath 46 disposed at submergible end 54 to be directed into molten metal bath 46 through elevated opening 55.

A wide variety of waste can be treated by the method of this invention. An example of a suitable carbonaceous material is a hydrogen-containing carbonaceous material, such as oil, or a waste which includes carbonaceous compounds containing nitrogen, sulfur, oxygen, etc. It is to be understood that the waste can include inorganic compounds. In addition to carbon, the waste can include other atomic constituents, such as halogens, metals, etc.

The waste received from charging hopper 80 is conducted through refractory tube 52 from upper end 55 to submergible end 54. The rate of transmission of waste in refractory tube is chosen taking into account factors such as the cooling desired, the rate of dissociation of the waste, etc. The waste substantially dissociates to form at least one dissociation product as it combines with molten metal bath 46 within refractory tube 52 at submergible end 54. The dissociation product is oxygenated by an oxidant within refractory tube 52 or molten metal bath 46. Oxygenation of the dissociation product causes formation of a gaseous oxygenated product in molten metal bath 46. In one embodiment, a substantial portion of the gaseous oxygenated product formed in molten metal bath 46 is formed within submergible end of refractory tube.

Optionally, oxygen can be introduced into molten metal bath 46 from oxygen source 66 through pipe 64 to oxygen inlet and is directed by pressure through refractory tube 52 to molten metal bath 46. Alternatively, an oxidizing agent can be introduced into molten metal bath 46 by other suitable means. It is to be understood, however, that more than one oxidizing agent tube can be located at lower portion 14 of reactor 12 for additional introduction of an oxidizing agent into reactor 12. For example, oxygen can be directed into molten metal bath 46 separately through a side or bottom portion of reactor 12. In one embodiment, oxygen is directed through oxygen inlet 24 of tuyere 20 to molten metal bath 46.

Since the interior of refractory tube 52 is sealed by valve means 84 and molten metal bath 46, gas formed by dissociation can cause pressure to build up until the pressure is at least sufficient to displace molten metal bath 46 in submergible end 54 to at least one elevated opening 56, thereby causing gas to flow out of refractory tube 52 through elevated opening 56 but beneath an upper surface of molten metal bath 46. Intimate mixing between the waste and the molten metal within submergible end 54 of refractory tube is caused by discharge of gas dissociation product, gaseous oxygenated product, and molten metal through elevated opening 56. The discharge of products and molten metal through elevated opening 56 causes additional molten metal of molten metal bath 46 to enter refractory tube 52 through elevated opening 56, lower elevated opening 57, or through a lower opening at refractory tube 52 at terminal end 58, which is below lower elevated opening 57.

As the waste continues to be directed into refractory tube 52 at upper end 55, additional contact of the waste and the molten metal causes dissociation of the waste stream to form a stream of dissociation product and gaseous oxygenated product to be discharged from refractory opening 56 into molten metal bath 46. At least a portion of the dissociation product which is discharged from refractory tube in molten metal bath is oxygenated to form additional gaseous oxygenated product.

The gaseous oxygenated product migrates out of molten metal bath 46 and is discharged out of reactor 12 through off-gas outlet 18. The gaseous oxygenated product can be further processed, if desired, by suitable means.

Equivalents

Those skilled in the art will recognize, or be able to ascertain using no more than routine experimentation, many equivalents to the specific embodiments of the invention described specifically herein. Such equivalents are intended to be encompassed in the scope of the claims.

We claim:

1. An apparatus for top-charging solid waste into a molten metal bath contained in a reactor, wherein the solid waste is dissociated into dissociation products which are subsequently oxidized to form a gaseous oxygenated product comprising:

a) a reactor having a reactor outlet disposed above the molten metal bath; and b) a refractory tube extending within the reactor, through which said solid waste can be introduced into the molten metal bath, said refractory tube having a submergible end for immersion into the molten metal bath, the submergible end having a lower opening at a terminal portion of the submergible end and at least one elevated opening, whereby a portion of the molten metal bath enters the refractory tube through the lower opening for dissociating the waste and for forming the oxygenated product, the gaseous oxygenated product passing out of the refractory tube through said elevated opening end being discharged from the reactor through the reactor outlet.

2. The apparatus of claim 1 further including oxygenating means for directing an oxidizing agent into the molten metal bath which reacts with the dissociation product to form the gaseous oxygenated product.

3. The apparatus of claim 2 wherein the oxygenating means is proximate to the refractory tube, whereby the dissociation product is substantially oxidized in the molten metal bath.

4. The apparatus of claim 3 wherein the elevated opening includes at least one slot.

5. The apparatus of claim 3 wherein the elevated opening includes at least one perforation.

6. The apparatus of claim 5 wherein the perforations are at an angle of less than 90° from vertical.

7. The apparatus of claim 6 wherein the refractory tube further includes a hydrocarbon inlet above the elevated opening.

8. The apparatus of claim 7 wherein the refractory tube further includes an inert gas inlet above the elevated opening.

9. The apparatus of claim 7 wherein the refractory tube further includes an oxygen gas inlet above the-elevated opening.

10. The apparatus of claim 9 further including means for heating the waste near the inlet of said refractory tube.

11. The apparatus of claim 10 wherein said means for heating includes an oxyfuel burner.

12. The apparatus of claim 10 wherein the heat source means includes a carbon dioxide plasma torch.

13. The apparatus of claim 3 wherein the refractory tube is retractable.

14. The apparatus for top-charging solid waste into a molten metal bath contained in a reactor, wherein the solid waste is dissociated into dissociation products which are subsequently oxidized to form a gaseous oxygenated product comprising:

a) a reactor having a reactor outlet disposed above the molten metal bath;

b) a refractory tube extending within the reactor, through which said solid waste can be introduced into the molten metal bath, said refractory tube having a submergible end for immersion into the molten metal bath, the submergible end having a lower opening at a terminal portion of the submergible end and at least one elevated opening, whereby a portion of the molten metal bath enters the refractory tube through the lower opening for dissociating the waste and for forming the oxygenated product, the gaseous oxygenated product passing out of the refractory tube through said elevated opening end being discharged from the reactor through the reactor outlet; and c) means for heating the waste near the inlet of said refractory tube.

15. The apparatus of claim 14 wherein said means for heating includes an oxyfuel burner.

16. The apparatus of claim 14 wherein the heat source means includes a carbon dioxide plasma torch.

17. The apparatus of claim 14 further including oxygenating means for directing an oxidizing agent into the molten metal bath which reacts with the dissociation product to form the gaseous oxygenated product.

18. The apparatus of claim 17 wherein the oxygenating means is proximate to the refractory tube, whereby the dissociation product is substantially oxidized in the molten metal bath.

19. The apparatus of claim 18 wherein the elevated opening includes at least one slot.

20. The apparatus of claim 18 wherein the elevated opening includes at least one perforation.

21. The apparatus of claim 19 wherein the refractory tube further includes a hydrocarbon inlet above the elevated opening.

22. The apparatus of claim 21 wherein the refractory tube further includes an inert gas inlet above the elevated opening.

23. The apparatus of claim 21 wherein the refractory tube further includes an oxygen gas inlet above the elevated opening.

24. The apparatus of claim 14 wherein the refractory tube is retractable.

* * * * *